W. W. DE BEVOISE.
EDIBLE CAKE AND METHOD OF MAKING SAME.
APPLICATION FILED AUG. 29, 1911.
1,020,481.
Patented Mar. 19, 1912.
Fig 1
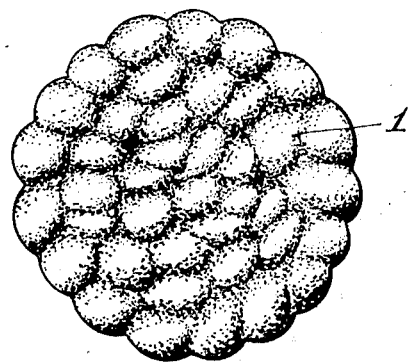
Fig 2
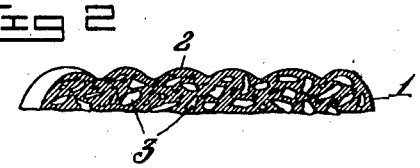
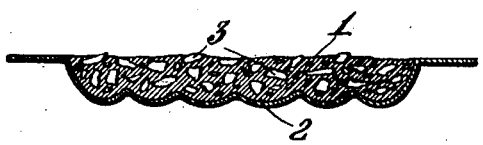
Fig 3
Witnesses
H. A. Robinette
A. L. Weaver
Inventor
Walter W. De Bevoise
By Meyers, Cushman & Rea
Attorney

UNITED STATES PATENT OFFICE.

WALTER W. DE BEVOISE, OF BROOKLYN, NEW YORK.

EDIBLE CAKE AND METHOD OF MAKING SAME.

1,020,481. Specification of Letters Patent. Patented Mar. 19, 1912.

Application filed August 29, 1911. Serial No. 646,681.

*To all whom it may concern:*

Be it known that I, WALTER W. DE BEVOISE, a citizen of the United States, residing at Brooklyn, in the county of Kings and State of New York, have invented new and useful Improvements in Edible Cakes and Method of Making Same, of which the following is a specification.

The present invention relates specifically to peanut candy and method of making, and for the purposes of this disclosure I have illustrated and described such an article and method of making it, but it will be understood that the invention is not limited to the particular embodiment herein set forth, as this disclosure is merely illustrative and not restrictive of the invention, for it will be quite obvious that the invention is applicable to the making of a variety of edible substances formed of a mixture of suitable vegetable ingredients and a suitable vehicle or binder.

In order that the invention may be better understood I have illustrated, in the drawings herewith, one embodiment of it, and in these drawings—

Figure 1 is a plan view of a peanut cake, made in accordance with my invention, Fig. 2 is a sectional view of the cake shown in Fig. 1, Fig. 3 is a view similar to Fig. 2, showing diagrammatically a molding or shaping plate with a cake deposited thereon.

The object of the invention is to produce a cake, the appearance of which is indicative of the vegetable ingredients commingled with the vehicle or binder, even though these ingredients are broken and not of their original or natural form, as for example, the form of a peanut kernel or meat, as in the present disclosure. I accomplish this object by shaping artificially, preferably by molding, a surface of the cake in imitation of a plurality of peanut kernels or meats, so that the appearance of the cake indicates to the purchaser that the article is a mixture of peanut meat and a suitable vehicle, one example of which is chocolate.

Referring to the drawings by numerals, 1 indicates the cake which may, of course, be of any form, that shown in the present embodiment being round and having a flat under-surface, the upper surface 2 of the article being artificially shaped, preferably by molds, so as to bear a plurality of rounded projections which imitate whole peanut meats incased in the chocolate vehicle or binder.

On reference to Figs. 1 and 2, it will be observed that the nut ingredients 3 are distributed throughout the body of the cake, but that the surface of the cake is practically unbroken by any protruding nut fragments, so that there is nothing to destroy the appearance on the surface 2 of the cake of whole meats. This condition and this particular distribution of the nut ingredients is secured by practicing the following method: The chocolate vehicle or binder is of greater specific gravity than the nut ingredients, and when the batch has been properly made by stirring into a melted chocolate binder the proper proportion of nut fragments, such admixture is placed in molds, as diagrammatically shown in Fig. 3, the semi-plastic mass being forced into the mold faces in any suitable manner to give the desired artificial surface formation. The vehicle or binder being of greater specific gravity than the nut fragments will settle close to the mold and will chill rapidly, the lighter nut fragments tending to move upwardly in the semi-plastic mass. This will result in giving to the finished surface of the cake a smooth, unbroken skin or shell of the chocolate vehicle or binder without exposing the nut fragments or breaking the appearance of the finished surface, it having been found in actual practice that the nut fragments, while evenly distributed throughout the cake, tend to float upwardly and are, to some extent, exposed on the unfinished or underside of the complete article.

The article and method of making the same which I have disclosed have various advantages, chief among which are that a candy attractive in appearance and indicative of the make-up and ingredients may be readily produced; the nut kernels may be broken or comminuted to a degree of fineness which permits them to be more readily consumed and digested than would be the case were whole nut kernels used; and nut stock which has, in cleaning and handling, become broken may yet be utilized in the production of a very palatable nut candy of high grade, whereas, in the manufacture of nut candies of this general type heretofore it has been customary to utilize only the whole kernels which were dipped and molded together in various ways.

As indicated I do not limit myself to the particular disclosure herein made or the specific vegetable ingredients, as obviously any of the nuts used in candy-making, as well as other vegetable products may be similarly treated without departing from my invention.

I claim:—

1. As a new article of manufacture, an edible cake composed of a cocoa vehicle or binder and intermixed nut fragments, a surface of said cake being shaped in imitation of the whole kernels of the nut.

2. As a new article of manufacture, an edible cake composed of a cocoa vehicle or binder and intermixed fragmentary peanut meats, the vehicle or binder at the surface of said cake being shaped artificially in imitation of peanut meats.

3. As a new article of manufacture, an edible cake composed of a digestible vehicle or binder having a surface shaped artificially in imitation of a plurality of nut meats, and intermixed nut ingredients, said nut ingredients lying wholly within the body of the vehicle and away from the artificially shaped surface so as to leave said shaped surface smooth and unbroken by protruding nut ingredients.

4. As a new article of manufacture, an edible cake composed of a digestible vehicle or binder and intermixed nut ingredients, a surface of said cake being shaped artificially in imitation of a plurality of unbroken meats.

5. The method of making nut candies, which consists in first intermixing nut ingredients with a vehicle or binder of greater specific gravity, and then shaping artificially the vehicle or binder at the surface of the cake in imitation of the nut ingredients and quickly cooling the under-surface of the batch; whereby an unbroken finishing surface of the binder material will be secured.

In testimony whereof I have hereunto set my hand in presence of two subscribing witnesses.

WALTER W. DE BEVOISE.

Witnesses:
R. WILFRED KEAST,
A. N. DE BEVOISE.